US012099392B2

(12) United States Patent
Wei et al.

(10) Patent No.: US 12,099,392 B2
(45) Date of Patent: Sep. 24, 2024

(54) DYNAMIC POWER CONSUMPTION ESTIMATION METHOD, APPARATUS, AND SYSTEM

(71) Applicant: Huawei Technologies Co., Ltd., Shenzhen (CN)

(72) Inventors: Wei Wei, Shanghai (CN); Zhou Zhou, Shanghai (CN); Yuwei Pu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 1043 days.

(21) Appl. No.: 17/014,371

(22) Filed: Sep. 8, 2020

(65) Prior Publication Data

US 2020/0401201 A1 Dec. 24, 2020

Related U.S. Application Data

(63) Continuation of application No. PCT/CN2019/077091, filed on Mar. 6, 2019.

(30) Foreign Application Priority Data

Mar. 8, 2018 (CN) .......................... 201810191683.1

(51) Int. Cl.
*G06F 1/08* (2006.01)
*G06F 1/28* (2006.01)
*G06F 119/06* (2020.01)

(52) U.S. Cl.
CPC .................. *G06F 1/28* (2013.01); *G06F 1/08* (2013.01); *G06F 2119/06* (2020.01)

(58) Field of Classification Search
CPC .......... G06F 1/28; G06F 1/08; G06F 2119/06; G06F 2117/04; G06F 30/396; G06F 30/33
See application file for complete search history.

(56) References Cited

U.S. PATENT DOCUMENTS

2004/0236971 A1\* 11/2004 Kopley ................. G06F 1/3203
713/320
2004/0236973 A1\* 11/2004 Srikantam ............ G06F 1/3228
713/320
(Continued)

FOREIGN PATENT DOCUMENTS

CN 101493717 A 7/2009
CN 101881812 A 11/2010
(Continued)

OTHER PUBLICATIONS

"System-Level Dynami c Power Analysis Cadence Palladium Dynamic Power Analysis," Jan. 1, 2011, 2 pages.
(Continued)

*Primary Examiner* — Manuel A Rivera Vargas
(74) *Attorney, Agent, or Firm* — Conley Rose, P.C.

(57) ABSTRACT

A dynamic power consumption estimation method includes recording a statistical value of each of n target signals of a to-be-measured target in a unit time, where the target signal is a clock signal obtained after clock gating and the statistical value is a quantity of times toggling, or the target signal is a clock gating signal and the statistical value is a quantity of enable cycles, and calculating the dynamic power consumption of the to-be-measured target in the unit time based on the statistical value of each of the n target signals in the unit time.

18 Claims, 2 Drawing Sheets

(56) References Cited

U.S. PATENT DOCUMENTS

| | | | |
|---|---|---|---|
| 2006/0290378 A1 | 12/2006 | Wilcox et al. | |
| 2008/0301593 A1* | 12/2008 | Jiang | G06F 30/396 716/132 |
| 2009/0271167 A1 | 10/2009 | Zhu et al. | |
| 2014/0115360 A1 | 4/2014 | Zhou et al. | |
| 2014/0316728 A1 | 10/2014 | Zhong et al. | |
| 2017/0160783 A1* | 6/2017 | Kawabe | G06F 1/324 |
| 2017/0234934 A1 | 8/2017 | Zhong et al. | |

FOREIGN PATENT DOCUMENTS

| | | | |
|---|---|---|---|
| CN | 102439535 A | 5/2012 | |
| CN | 102866291 A | 1/2013 | |
| CN | 102866912 A | 1/2013 | |

OTHER PUBLICATIONS

Wang, M., "Blog Collection Books: Deep Understanding of Altera FPGA Application Design," Beihang University Press, Jan. 2014, 6 pages. With English abstract.

Ze, T., "SoC Design Methodology," Publisher: Northwestern Polytechnical University Press; 1st Edition, Dec. 2016, 1 page with English abstract.

* cited by examiner

DYNAMIC POWER CONSUMPTION ESTIMATION METHOD, APPARATUS, AND SYSTEM

CROSS-REFERENCE TO RELATED APPLICATIONS

This application is a continuation of International Patent Application No. PCT/CN2019/077091, filed on Mar. 6, 2019, which claims priority to Chinese Patent Application No. 201810191683.1, filed on Mar. 8, 2018. The disclosures of the aforementioned applications are hereby incorporated by reference in their entireties.

TECHNICAL FIELD

Embodiments of this application relate to the field of chip technologies, and in particular, to a dynamic power consumption estimation method, apparatus, and system.

BACKGROUND

To meet increasing temperature scheduling requirements, ARM develops an energy aware scheduling (EAS) and intelligent power allocation (IPA) (referred to as "EAS&IPA" below) technology, to dynamically adjust operating frequencies of subsystems in a system on chip (SOC) to maximize utilization of heat dissipation space. In this way, system performance is optimized, and user temperature experience is optimized.

In the EAS&IPA technology, to control temperature and schedule a corresponding subsystem, the following parameters need to be obtained a temperature, power consumption, and load. It is relatively easy to obtain precise values of the temperature and the load. However, a method for obtaining power consumption provided in other approaches features relatively low accuracy.

Power consumption of the SOC includes two parts static power consumption and dynamic power consumption. The static power consumption is mainly caused by factors such as an electrostatic current and a leakage current. The dynamic power consumption is mainly caused by factors such as a crowbar current and a load current that are generated during signal conversion in a circuit. Currently, a method for obtaining dynamic power consumption provided in other approaches is as follows. Dynamic power consumption is obtained through static conversion using a parameter such as a voltage, a frequency, or a load ratio.

However, accuracy of dynamic power consumption obtained using the foregoing method is relatively low.

SUMMARY

This application provides a dynamic power consumption estimation method, apparatus, and system, to improve accuracy of dynamic power consumption estimation.

According to an aspect, an embodiment of this application provides a dynamic power consumption estimation apparatus. The apparatus includes a counting unit and an operation unit. The counting unit is configured to record a statistical value of each of n target signals of a to-be-measured target in a unit time, where the target signal is a clock signal obtained after clock gating and the statistical value is a quantity of times toggling is performed, or the target signal is a clock gating signal and the statistical value is a quantity of enable cycles, and send the statistical value of each of the n target signals in the unit time to the operation unit, where n is a positive integer. The operation unit is configured to calculate dynamic power consumption of the to-be-measured target in the unit time based on the statistical value of each of the n target signals in the unit time.

In the solution provided in this embodiment of this application, statistical values of the n target signals of the to-be-measured target in the unit time are recorded, and the dynamic power consumption of the to-be-measured target in the unit time is calculated based on the statistical values. The target signal is a clock signal obtained after clock gating or a clock gating signal, the target signal reflects a toggling status of each circuit module in the to-be-measured target, and a circuit module that is not toggled naturally has no dynamic power consumption. Therefore, high accuracy is achieved when dynamic power consumption is estimated using the foregoing method based on an actual toggling status of a circuit.

In a possible design, the apparatus provided in this embodiment of this application further includes a storage unit. The storage unit is configured to store a weight coefficient corresponding to each of the n target signals. The operation unit is further configured to calculate the dynamic power consumption of the to-be-measured target in the unit time based on the statistical value of each of the n target signals in the unit time and the weight coefficient corresponding to each of the n target signals.

Optionally, the operation unit is further configured to calculate the dynamic power consumption p of the to-be-measured target in the unit time based on the following formula $$p = \sum_{i=1}^{n} a_i k_i + \varepsilon,$$

where $k_i$ represents a statistical value of an $i^{th}$ target signal in the n target signals in the unit time, $a_i$ represents a weight coefficient corresponding to the $i^{th}$ target signal, $\varepsilon$ represents an error term, $1 \le i \le n$, and i is an integer.

In a possible design, the counting unit includes n counters. Optionally, the n counters work asynchronously. Each of the n counters is configured to count a statistical value of one target signal in the unit time.

Clock tree setting and convergence in the to-be-measured target require a large amount of workload. If synchronous convergence needs to be performed between the target signal input into the counter and a counting clock, substantial resources and time need to be consumed for processing, affecting a convergence sequence of submodules in the to-be-measured target. The n counters work asynchronously, and therefore synchronous convergence may not be performed between the target signal and the counting clock, to save processing resources and time.

In a possible design, there is multi-level clock gating in the to-be-measured target. The target signal is a clock signal obtained after first-level clock gating, or the target signal is a first-level clock gating signal.

Coverage of a circuit module corresponding to the clock signal obtained after the first-level clock gating or the first-level clock gating signal is already relatively high. Therefore, accuracy of dynamic power consumption estimation can be ensured, and it can be ensured that a quantity of obtained target signals is not excessively large, thereby effectively controlling calculation complexity.

According to another aspect, an embodiment of this application provides an electronic device. The electronic device includes the dynamic power consumption estimation apparatus according to the foregoing aspect.

According to still another aspect, an embodiment of this application provides a dynamic power consumption estimation method. The method includes recording a statistical value of each of n target signals of a to-be-measured target in a unit time, where n is a positive integer, and calculating dynamic power consumption of the to-be-measured target in the unit time based on the statistical value of each of the n target signals in the unit time.

In a possible design, a formula for calculating the dynamic power consumption is obtained using the following method obtaining j test power consumption segments, where each of the j test power consumption segments includes the statistical value $K_j$ of each of the n target signals of the to-be-measured target in the unit time and the dynamic power consumption $p_j$ of the to-be-measured target in the unit time, and j is a positive integer, fitting $K_j$ and $p_j$ in the j test power consumption segments through linear regression, and determining the formula based on a fitting result.

In a possible design, the obtaining j test power consumption segments includes constructing an electronics design automation (EDA) simulation environment, where the EDA simulation environment includes a register transfer level (RTL) of the to-be-measured target and an RTL of an intelligent temperature scheduling (ITS) module, the RTL of the to-be-measured target is used to simulate a function of a module other than the ITS module in the to-be-measured target, the RTL of the ITS module is used to simulate a function of the ITS module, and the ITS module is configured to implement dynamic power consumption estimation, and executing j test cases in the EDA simulation environment to obtain the j test power consumption segments.

In the solution provided in this embodiment of this application, the test power consumption segments are obtained through EDA simulation, and the dynamic power consumption calculation formula is subsequently obtained through training based on the test power consumption segments such that a relatively accurate formula can be obtained before finished product processing of a chip is completed.

According to yet another aspect, an embodiment of this application provides a dynamic power consumption estimation system. The system includes a processor and a memory. The memory is configured to store an instruction, and the processor is configured to perform the steps of the foregoing dynamic power consumption estimation method based on the instruction.

DESCRIPTION OF EMBODIMENTS

To make the objectives, technical solutions, and advantages of this application clearer, the following further describes the implementations of this application in detail with reference to the accompanying drawings.

Figure 1:
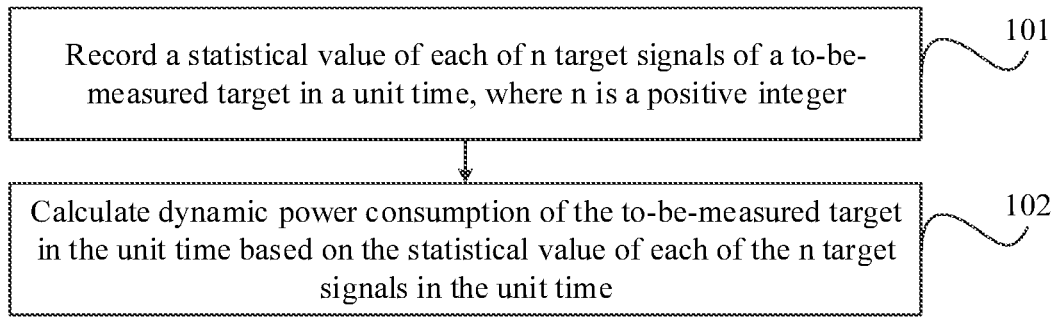
FIG. 1 is a flowchart of a dynamic power consumption estimation method according to an embodiment of this application.

FIG. 1 is a flowchart of a dynamic power consumption estimation method according to an embodiment of this application. The method may include the following several steps.

Step 101. Record a statistical value of each of n target signals of a to-be-measured target in a unit time, where n is a positive integer.

In this embodiment of this application, the to-be-measured target may be a chip, a chip system including two or more chips, or a part of a circuit module in a chip. In an example, the to-be-measured target is an SOC. The SOC is an application-specific integrated circuit (ASIC), includes a complete system, and is embedded with software. In a terminal such as a mobile phone or a tablet computer, the SOC may be an application processor (AP) chip. The AP chip includes an application processor and one or more devices other than the application processor, for example, a memory and a graphics processor.

In an example of this application, the target signal is a clock signal obtained after clock gating and the statistical value is a quantity of times toggling is performed. That is, step 101 is as follows. Record a quantity of times each of the n clock signals of the to-be-measured target that are obtained after clock gating is toggled in the unit time. Toggling of a clock signal refers to switching of the clock signal between a high level and a low level. One time of toggling is recorded when the clock signal changes from the high level to the low level or changes from the low level to the high level.

In another example of this application, the target signal is a clock gating signal, and the statistical value is a quantity of enable cycles. That is, step 101 is as follows. Record a quantity of enable cycles of each of the n clock gating signals of the to-be-measured target in the unit time.

A clock gating technology is a simple and effective power consumption control method. A basic principle of the clock gating technology is to disable a function that is not used temporarily and a clock corresponding to the function in a chip to reduce power consumption. In the clock gating technology, a logical operation is performed between a clock gating signal and a clock signal, to gate the clock signal. For example, an AND operation is performed between a clock gating signal and a clock signal, to control an active time of the clock signal. The to-be-measured target (for example, the SOC) may include a plurality of circuit modules with different functions. Therefore, the to-be-measured target may include a plurality of clock signals, and each clock signal may be controlled using the clock gating technology.

The n target signals may be all target signals in the to-be-measured target, or may be some target signals in the to-be-measured target. Usually, a larger quantity of obtained target signals indicates higher coverage of a corresponding circuit module. This helps improve accuracy of subsequently estimated dynamic power consumption, but increases calculation complexity correspondingly. On the contrary, a smaller quantity of obtained target signals indicates lower coverage of a corresponding circuit module. This reduces accuracy of subsequently estimated dynamic power consumption, but reduces calculation complexity correspondingly. Therefore, proper selection needs to be made in determining the target signal to be obtained, to balance accuracy of dynamic power consumption estimation and calculation complexity.

There may be multi-level clock gating for a clock signal. For example, after first-level clock gating is performed on an initial clock signal, a clock signal after the first-level clock gating is obtained, after second-level clock gating is performed on the clock signal obtained after the first-level clock gating, a clock signal after the second-level clock gating is obtained, and so on. Optionally, when there is multi-level clock gating in the to-be-measured target, the n obtained target signals are clock signals obtained after first-level clock gating or first-level clock gating signals. The first-level clock gating signal is a clock gating signal for performing a logical operation with an initial clock signal in the first-level clock gating. Coverage of circuit modules corresponding to the n target signals obtained using the foregoing method is already relatively high. Therefore, accuracy of dynamic power consumption estimation can be ensured, and it can be ensured that a quantity of obtained target signals is not excessively large, thereby effectively controlling calculation complexity.

After the n target signals are obtained, the statistical value of each target signal is counted. The unit time is used as a counting cycle, and the unit time may be preset, for example, 1 microsecond (μs) or 1 millisecond (ms). This is not limited in this embodiment of this application.

Optionally, the statistical value is counted using a hardware counter, and the following several substeps are included. 1. Respectively input the n target signals into n counters. 2. Count statistical values of the n target signals in the unit time using the n counters.

The n target signals are in a one-to-one correspondence with the n counters. In other words, one counter is configured to count a statistical value of one target signal.

The counter includes a clock input end and an enable input end.

In an example of this application, when the target signal is a clock signal obtained after clock gating, a clock signal obtained after clock gating is input into the clock input end of the counter, and an enable signal input into the enable input end of the counter is used to control the counter to start and stop counting. The enable signal can be set based on duration of the unit time, and a counting result of the counter is a quantity of times the clock signal obtained after the clock gating is toggled in the unit time. For example, after a logical operation is performed between a clock signal and a clock gating signal, a clock signal obtained after clock gating is obtained, and a quantity of times the clock signal obtained after the clock gating is toggled in the unit time is 8, indicating that a sum of a quantity of times the clock signal obtained after the clock gating changes from a high level to a low level in the unit time and a quantity of times the clock signal obtained after the clock gating changes from the low level to the high level in the unit time is 8.

In another example of this application, when the target signal is a clock gating signal, a clock signal is input into the clock input end of the counter, and a clock gating signal is input into the enable input end of the counter. A counting result of the counter is a quantity of enable cycles in the unit time. The quantity of enable cycles in the unit time is a quantity of cycles in which the clock gating signal allows the clock signal to be normally toggled in the unit time. A normal toggling cycle refers to a toggling process between two adjacent rising edges or a toggling process between two adjacent falling edges. The simplest "AND" logic is used as an example. If the clock gating signal is at a high level, only a high level is output regardless of whether the clock signal is at a high level or a low level. In other words, the output is fixed to a high level. That is, the clock signal cannot be normally toggled after undergoing high-level clock gating. When the clock gating signal is at a low level, an output entirely depends on the clock signal. If the clock signal is toggled, the output is also toggled. It is assumed that a quantity of cycles in which a clock signal is normally toggled in the unit time is 20. Both the clock signal and the foregoing clock gating signal are used as inputs of the "AND" logic, and a clock signal obtained after clock gating is output. If a quantity of cycles in which the clock signal obtained after the clock gating is normally toggled in the unit time is 12, a quantity of enable cycles of the clock gating signal in the unit time is 12. In addition, a same clock signal or different clock signals may be input into the counters. This is not limited in this embodiment of this application. Furthermore, the clock signal input into the counter may be a clock signal of a circuit module in the to-be-measured target, or may be another preset clock signal.

Optionally, the n counters may work synchronously or asynchronously. Clock tree setting and convergence in the to-be-measured target require a large amount of workload. If synchronous convergence needs to be performed between the target signal input into the counter and a counting clock, substantial resources and time need to be consumed for processing, affecting a convergence sequence of submodules in the to-be-measured target. The n counters work asynchronously, and therefore synchronous convergence may not be performed between the target signal and the counting clock, to save processing resources and time.

Step 102. Calculate dynamic power consumption of the to-be-measured target in the unit time based on the statistical value of each of the n target signals in the unit time.

After the statistical value of each target signal in the unit time is recorded, the dynamic power consumption of the to-be-measured target in the unit time may be calculated based on a function relationship that is between the statistical value of each target signal and dynamic power consumption and that is obtained through pre-fitting. The function relationship may be referred to as a dynamic power consumption calculation formula or a power consumption calculation model. A fitting process of the function relationship is described in the following embodiment.

In an example, a weight coefficient corresponding to each of the n target signals is obtained through fitting using a linear regression algorithm. Correspondingly, when the dynamic power consumption is calculated, the dynamic power consumption of the to-be-measured target in the unit time is calculated based on the quantity of times each of the n target signals is toggled in the unit time and the weight coefficient corresponding to each of the n target signals. Optionally, the dynamic power consumption p of the to-be-measured target in the unit time is calculated based on the following formula $$p = \sum_{i=1}^{n} a_i k_i + \varepsilon,$$

where $k_i$ represents a statistical value of an $i^{th}$ target signal in the n target signals in the unit time, $a_i$ represents a weight coefficient corresponding to the $i^{th}$ target signal, $\varepsilon$ represents an error term, $1 \leq i \leq n$, and i is an integer. A value of the error term $\varepsilon$ may be determined in a training process of the formula, and is used to represent an intrinsic error of the formula.

The dynamic power consumption may be input into an EAS&IPA module of the to-be-measured target (for example, the SOC), and the EAS&IPA module performs scheduling and temperature control based on a parameter such as the dynamic power consumption, static power consumption, a temperature, and load.

In the technical solution provided in this embodiment of this application, statistical values of the n target signals of the to-be-measured target in the unit time are recorded, and the dynamic power consumption of the to-be-measured target in the unit time is calculated based on the statistical values. The target signal is a clock signal obtained after clock gating or a clock gating signal, the target signal reflects a toggling status of each circuit module in the to-be-measured target, and a circuit module that is not toggled naturally has no dynamic power consumption. Therefore, high accuracy is achieved when dynamic power consumption is estimated using the foregoing method based on an actual toggling status of a circuit.

Figure 2:
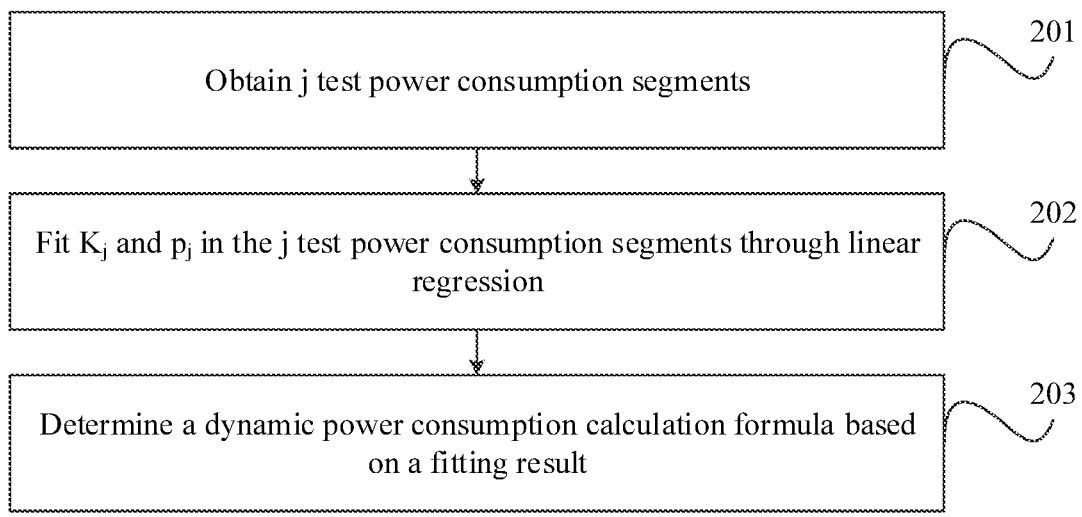
FIG. 2 is a flowchart of a training process according to an embodiment of this application.

The following describes a training process of the foregoing dynamic power consumption calculation formula in an embodiment in FIG. 2. The training process may include the following several steps.

Step 201. Obtain j test power consumption segments.

Each of the j test power consumption segments includes a statistical value $K_j$ of each of n target signals of the to-be-measured target in a unit time and dynamic power consumption $p_j$ of the to-be-measured target in the unit time, where j is a positive integer, and n is a positive integer. For description of the to-be-measured target, the target signal, and the statistical value, refer to the foregoing description. Details are not described herein again.

In this embodiment of this application, the j test power consumption segments are obtained through EDA simulation. First, an EDA simulation environment is constructed. The EDA simulation environment includes an RTL of the to-be-measured target and an RTL of an ITS module. The RTL of the to-be-measured target is used to simulate a function of a module other than the ITS module in the to-be-measured target, the RTL of the ITS module is used to simulate a function of the ITS module, and the ITS module is configured to implement dynamic power consumption estimation. Then, j test cases are executed in the EDA simulation environment to obtain the j test power consumption segments. The statistical value included in each test power consumption segment may be obtained through statistics collection by the RTL of the ITS module, and the dynamic power consumption is output through EDA simulation.

Step 202. Fit $K_j$ and $p_j$ in the j test power consumption segments through linear regression.

Optionally, $K_j$ and $p_j$ in the j test power consumption segments are fitted through linear regression, and a fitting result is a function relationship between the statistical value of each target signal and dynamic power consumption. Linear regression is a statistical analysis method in which regression analysis in mathematical statistics is used to determine a quantitative relationship between two or more variables. In linear regression, a relationship between one or more independent variables and dependent variables can be modeled using a least square function that is named a linear regression equation, to obtain the relationship between an independent variable and a dependent variable.

Step 203. Determine the dynamic power consumption calculation formula based on the fitting result.

Specifically, weight coefficients respectively corresponding to the n target signals in the formula are determined.

For example, the weight coefficient that corresponds to each of the n target signals and that is obtained through fitting using a linear regression algorithm is shown in Table 1.

TABLE 1

| Sequence number of a target signal | Weight coefficient |
|---|---|
| 1 | 5.496485e+00 |
| 2 | 4.212942e+00 |
| 3 | 3.451386e+00 |
| 4 | −6.889167e+01 |
| 5 | 1.377307e+01 |
| 6 | −5.568340e+00 |
| ... | ... |

In this embodiment of this application, the test power consumption segments are obtained through EDA simulation, and the dynamic power consumption calculation formula is subsequently obtained through training based on the test power consumption segments such that a relatively accurate formula can be obtained before finished product processing of a chip is completed.

In addition, after the finished product processing of the chip is completed, several check power consumption segments may be obtained. Each check power consumption segment includes the statistical value of each of the n target signals of the to-be-measured target in the unit time and the dynamic power consumption that is of the to-be-measured target in the unit time and that is obtained through measurement. Accuracy of the formula is checked using the check power consumption segment. If expected accuracy is not achieved, a new test power consumption segment is used to train the formula, and training is stopped until the expected accuracy is achieved. The formula for which training is completed may be embedded into a hardware circuit for dynamic power consumption estimation, to perform dynamic power consumption estimation.

The following describes apparatus and system embodiments of this application. For details that are not disclosed in the apparatus and system embodiments of this application, refer to the method embodiments of this application.

Figure 3:
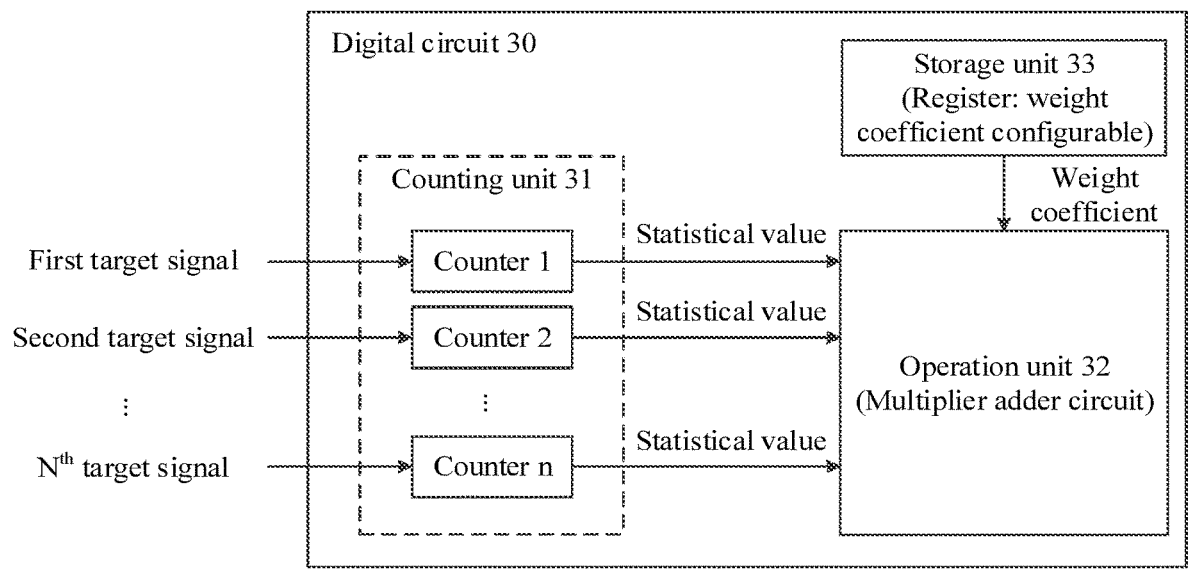
FIG. 3 is a schematic diagram of a dynamic power consumption estimation apparatus according to an embodiment of this application.

FIG. 3 is a schematic diagram of a dynamic power consumption estimation apparatus 30 according to an embodiment of this application. The dynamic power consumption estimation apparatus 30 may be implemented by hardware. For example, the dynamic power consumption estimation apparatus 30 may be a digital circuit. Optionally, the dynamic power consumption estimation apparatus 30 is a to-be-measured target (for example, an SOC) or a part of circuit modules of the to-be-measured target. Alternatively, the dynamic power consumption estimation apparatus 30 may be implemented by hardware by executing corresponding software. As shown in FIG. 3, the dynamic power consumption estimation apparatus 30 may include a counting unit 31 and an operation unit 32.

The counting unit 31 is configured to record a statistical value of each of n target signals of a to-be-measured target in a unit time, where the target signal is a clock signal obtained after clock gating and the statistical value is a quantity of times toggling is performed, or the target signal is a clock gating signal and the statistical value is a quantity of enable cycles, and send the statistical value of each of the n target signals in the unit time to the operation unit 32, where n is a positive integer.

The operation unit 32 is configured to calculate dynamic power consumption of the to-be-measured target in the unit time based on the quantity of times toggling of each of the n target signals in the unit time.

Optionally, the dynamic power consumption estimation apparatus 30 further includes a storage unit 33.

The storage unit 33 is configured to store a weight coefficient corresponding to each of the n target signals. Optionally, the storage unit 33 is further configured to store a calculation result of the operation unit 32, that is, dynamic power consumption.

The operation unit 32 is further configured to calculate the dynamic power consumption of the to-be-measured target in the unit time based on the statistical value of each of the n target signals in the unit time and the weight coefficient corresponding to each of the n target signals.

In an example, the operation unit 32 is further configured to calculate the dynamic power consumption p of the to-be-measured target in the unit time based on the following formula $$p = \sum_{i=1}^{n} a_i k_i + \varepsilon,$$

where $k_i$ represents a statistical value of an $i^{th}$ target signal in the n target signals in the unit time, $a_i$ represents a weight coefficient corresponding to the $i^{th}$ target signal, $\varepsilon$ represents an error term, $1 \leq i \leq n$, and i is an integer.

Optionally, the counting unit 31 includes n counters. The foregoing n counters are shown in FIG. 3 as a counter 1, a counter 2, ..., and a counter n. Optionally, the n counters work asynchronously. Each of the n counters is configured to count a statistical value of one target signal in the unit time.

Optionally, there is multi-level clock gating in the to-be-measured target. The target signal is a clock signal obtained after first-level clock gating, or the target signal is a first-level clock gating signal.

Optionally, the dynamic power consumption estimation apparatus 30 further includes a configuration unit and a clock generation unit (not shown).

The configuration unit is configured to configure processing logic and parameters of the operation unit 32, for example, configure a calculation formula of dynamic power consumption and a weight coefficient. The clock generating unit generates a clock signal for controlling the operation unit 32.

It should be noted that the dynamic power consumption estimation apparatus 30 may include a corresponding hardware circuit structure to implement the foregoing functions. For example, the counting unit 31 includes n counters which are implemented by hardware circuits. The operation unit 32 may be a hardware multiplier adder circuit. The storage unit 33 may be a register. The register is configured to store a weight coefficient, and the weight coefficient stored in the register is configurable. The weight coefficient is determined according to a training result of a formula, and is configured in the register. The hardware multiplier adder circuit can read the weight coefficient from the register, and perform a multiply-add operation with reference to a statistical value output by each counter, to obtain dynamic power consumption.

In the technical solution provided in this embodiment of this application, statistical values of the n target signals of the to-be-measured target in the unit time are recorded, and the dynamic power consumption of the to-be-measured target in the unit time is calculated based on the statistical values. The target signal is a clock signal obtained after clock gating or a clock gating signal, the target signal reflects a toggling status of each circuit module in the to-be-measured target, and a circuit module that is not toggled naturally has no dynamic power consumption. Therefore, high accuracy is achieved when dynamic power consumption is estimated using the foregoing method based on an actual toggling status of a circuit.

Figure 4:
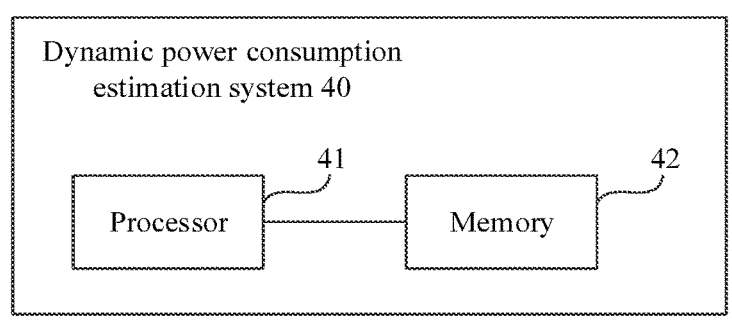
FIG. 4 is a schematic diagram of a dynamic power consumption estimation system according to an embodiment of this application.

FIG. 4 is a schematic diagram of a dynamic power consumption estimation system 40 according to an embodiment of this application. The dynamic power consumption estimation system 40 may be a chip, a chip system including two or more chips, or a part of a circuit module in a chip. Optionally, the dynamic power consumption estimation system 40 is an SOC. As shown in FIG. 4, the dynamic power consumption estimation system 40 may include a processor 41 and a memory 42.

The processor 41 may be a central processing unit (CPU), a general-purpose processor, a digital signal processor (DSP), an ASIC, a field-programmable gate array (FPGA) or another programmable logical device, a transistor logical device, a hardware component, or a combination thereof. The processor 41 may be a combination of processors implementing a computing function, for example, a combination of one or more microprocessors or a combination of a DSP and a microprocessor.

The memory 42 may be random-access memory (RAM), a flash memory, a read-only memory (ROM), an erasable programmable ROM (EPROM), an electrically erasable programmable ROM (EEPROM), a register, a hard disk, a mobile hard disk, a compact disc ROM (CD-ROM), or any other form of storage medium well-known in the art.

The processor 41 and the memory 42 may be connected to each other using the bus. The bus may be a peripheral component interconnect (PCI) bus, an extended industry standard architecture (EISA) bus, or the like. The bus may be classified into an address bus, a data bus, a control bus, and the like.

In the foregoing embodiment in FIG. 3, steps of the method described in the content disclosed in this embodiment of this application are implemented by hardware. In this embodiment, steps of the method described in the content disclosed in this embodiment of this application are implemented by the processor 41 by executing a hardware instruction. The software instruction may be stored in the memory 42. Specifically, the memory 42 is configured to store an instruction, and the processor 41 is configured to perform the following steps based on the instruction recording a statistical value of each of n target signals of a to-be-measured target in a unit time, where the target signal is a clock signal obtained after clock gating and the statistical value is a quantity of times toggling, or the target signal is a clock gating signal and the statistical value is a quantity of enable cycles, where n is a positive integer, and calculating dynamic power consumption of the to-be-measured target in the unit time based on the statistical value of each of the n target signals in the unit time.

Optionally, the processor 41 is configured to further perform the following steps based on the instruction calculating the dynamic power consumption of the to-be-measured target in the unit time based on the statistical value of each of the n target signals in the unit time and the weight coefficient corresponding to each of the n target signals.

Optionally, the processor 41 is configured to further perform the following steps based on the instruction calculating the dynamic power consumption p of the to-be-measured target in the unit time based on the following formula $$p = \sum_{i=1}^{n} a_i k_i + \varepsilon,$$

where $k_i$ represents a statistical value of an $i^{th}$ target signal in the n target signals in the unit time, $a_i$ represents a weight coefficient corresponding to the $i^{th}$ target signal, $\varepsilon$ represents an error term, $1 \leq i \leq n$, and i is an integer.

Optionally, the processor 41 is configured to further perform the following steps based on the instruction separately inputting the n target signals to n counters, where the n target signals are in a one-to-one correspondence with the n counters, and counting statistical values of the n target signals in the unit time using the n counters.

An example embodiment of this application further provides an electronic device. The electronic device includes the dynamic power consumption estimation apparatus 30 provided in the embodiment shown in FIG. 3 or includes the dynamic power consumption estimation system 40 provided in the embodiment shown in FIG. 4. Optionally, the electronic device may be a mobile phone, a tablet computer, an e-book reader, a multimedia playback device, a wearable device, a personal computer (PC), or the like. This is not limited in this embodiment of this application.

In the foregoing specific implementations, the objectives, technical solutions, and benefits of the embodiments of this application are further described in detail. It should be understood that the foregoing descriptions are merely specific implementations of the embodiments of this application, but are not intended to limit the protection scope of the embodiments of this application. Any modification, equivalent replacement, or improvement made based on technical solutions of the embodiments of this application shall fall within the protection scope of the embodiments of this application.

What is claimed is:

1. A dynamic power consumption method, comprising:
   recording a statistical value of each of a plurality of target signals of a to-be-measured target in a unit time, wherein the to-be-measured target has a multi-level clock gating, wherein each of the target signals is a clock signal after first-level clock gating and the statistical value is a quantity of times toggling, or wherein each of the target signals is a clock gating signal and the statistical value is a quantity of enable cycles;
   calculating dynamic power consumption of the to-be-measured target in the unit time based on the statistical value in the unit time;
   constructing an electronic design automation (EDA) simulation environment comprising a first register transfer level (RTL) of the to-be-measured target and a second RTL of an intelligent temperature scheduling (ITS) system, wherein the first RTL simulates a first function of the to-be-measured target except a second function of the ITS system, wherein the second RTL simulates the second function of the ITS system, and wherein the ITS system implements dynamic power consumption estimation; and
   executing a plurality of test cases in the EDA simulation environment to obtain a plurality of test power consumption segments, wherein each of the test power consumption segments comprises a statistical value of each of the target signals of the to-be-measured target in the unit time and the dynamic power consumption of the to-be-measured target in the unit time.

2. The dynamic power consumption method of claim 1, further comprising calculating the dynamic power consumption of the to-be-measured target in the unit time based on the statistical value of each of the target signals in the unit time and a weight coefficient corresponding to each of the target signals.

3. The dynamic power consumption method of claim 2, further comprising calculating the dynamic power consumption of the to-be-measured target in the unit time according to the following equation:

$$p = \sum_{i=1}^{n} a_i k_i + \varepsilon,$$

wherein $k_i$ represents a statistical value of an $i^{th}$ target signal in the target signals in the unit time, wherein $a_i$ represents a weight coefficient corresponding to the $i^{th}$ target signal, wherein $\varepsilon$ represents an error term, wherein $1 \leq i \leq n$, and wherein i is an integer.

4. The dynamic power consumption method of claim 3, further comprising:
   fitting the statistical value of each of the target signals of the to-be-measured target and the unit time and the dynamic power consumption of the to-be-measured target in the unit time in the test power consumption segments through linear regression; and
   determining the dynamic power consumption according to a fitting result.

5. The dynamic power consumption method of claim 1, further comprising:
   inputting the target signals to a plurality of counters; and
   counting statistical values of the target signals in the unit time using the counters.

6. The dynamic power consumption method of claim 1, wherein the target signals reflect a toggling status of each circuit module of a plurality of circuit modules in the to-be-measured target.

7. The dynamic power consumption method of claim 1, wherein each of the target signals is a first-level clock gating signal.

8. A dynamic power consumption estimation system, comprising:
   a processor; and
   a memory coupled to the processor and storing instructions that, when executed by the processor, cause the dynamic power consumption estimation system to:
      record a statistical value of each of a plurality of target signals of a to-be-measured target in a unit time, wherein the to-be-measured target has a multi-level clock gating, wherein each of the target signals is a clock signal after first-level clock gating and the statistical value is a quantity of times toggling or wherein each of the target signals is a clock gating signal and the statistical value is a quantity of enable cycles; and
      calculate dynamic power consumption of the to-be-measured target in the unit time based on the statistical value in the unit time;
      construct an electronic design automation (EDA) simulation environment comprising a first register transfer level (RTL) of the to-be-measured target and a second RTL of an intelligent temperature scheduling (ITS) system, wherein the first RTL simulates a first function of the to-be-measured target except a second function of the ITS system, wherein the second RTL simulates the second function of the ITS system, and wherein the ITS system implements dynamic power consumption estimation; and execute a plurality of test cases in the EDA simulation environment to obtain a plurality of test power consumption segments, wherein each of the test power consumption segments comprises a statistical value of each of the target signals of the to-be-measured target in the unit time and the dynamic power consumption of the to-be-measured target in the unit time.

9. The dynamic power consumption estimation system of claim 8, wherein the instructions further cause the dynamic power consumption estimation system to be configured to calculate the dynamic power consumption of the to-be-measured target in the unit time based on the statistical value of each of the target signals in the unit time and a weight coefficient corresponding to each of the target signals.

10. The dynamic power consumption estimation system of claim 9, wherein the instructions further cause the dynamic power consumption estimation system to be configured to calculate the dynamic power consumption of the to-be-measured target in the unit time according to the following equation:

$$p = \sum_{i=1}^{n} a_i k_i + \varepsilon,$$

wherein $k_i$ represents a statistical value of an $i^{th}$ target signal in the target signals in the unit time, wherein $a_i$ represents a weight coefficient corresponding to the $i^{th}$ target signal, wherein $\varepsilon$ represents an error term, wherein $1 \leq i \leq n$, and wherein i is an integer.

11. The dynamic power consumption estimation system of claim 10, wherein the instructions further cause the dynamic power consumption estimation system to be configured to:
fit the statistical value of each of the target signals of the to-be-measured target and the unit time and the dynamic power consumption of the to-be-measured target in the unit time in the test power consumption segments through linear regression; and
determine the dynamic power consumption according to a fitting result.

12. The dynamic power consumption estimation system of claim 8, further comprising:
input the target signals to a plurality of counters; and
count statistical values of the target signals in the unit time using the counters.

13. A computer program product comprising computer-executable instructions stored on a non-transitory computer-readable storage medium, the computer-executable instructions when executed by a processor of an apparatus, cause the apparatus to:
record a statistical value of each of a plurality of target signals of a to-be-measured target in a unit time, wherein the to-be-measured target has a multi-level clock gating, wherein each of the target signals is a clock signal after first-level clock gating and the statistical value is a quantity of times toggling, or wherein each of the target signals is a clock gating signal and the statistical value is a quantity of enable cycles;

calculate dynamic power consumption of the to-be-measured target in the unit time based on the statistical value in the unit time;

construct an electronic design automation (EDA) simulation environment comprising a first register transfer level (RTL) of the to-be-measured target and a second RTL of an intelligent temperature scheduling (ITS) system, wherein the first RTL simulates a first function of the to-be-measured target except a second function of the ITS system, wherein the second RTL simulates the second function of the ITS system, and wherein the ITS system implements dynamic power consumption estimation; and execute a plurality of test cases in the EDA simulation environment to obtain a plurality of test power consumption segments, wherein each of the test power consumption segments comprises a statistical value of each of the target signals of the to-be-measured target in the unit time and the dynamic power consumption of the to-be-measured target in the unit time.

14. The computer program product of claim 13, wherein the computer-executable instructions when executed by the processor of the apparatus further cause the apparatus to calculate the dynamic power consumption of the to-be-measured target in the unit time based on the statistical value of each of the target signals in the unit time and a weight coefficient corresponding to each of the target signals.

15. The computer program product of claim 14, wherein the computer-executable instructions when executed by the processor of the apparatus further cause the apparatus to calculate the dynamic power consumption of the to-be-measured target in the unit time according to the following equation:

$$p = \sum_{i=1}^{n} a_i k_i + \varepsilon,$$

wherein $k_i$ represents a statistical value of an $i^{th}$ target signal in the target signals in the unit time, wherein $a_i$ represents a weight coefficient corresponding to the $i^{th}$ target signal, wherein $\varepsilon$ represents an error term, wherein $1 \leq i \leq n$, and wherein i is an integer.

16. The computer program product of claim 15, wherein the computer-executable instructions when executed by the processor of the apparatus further cause the apparatus to calculate:
fitting the statistical value of each of the target signals of the to-be-measured target and the unit time and the dynamic power consumption of the to-be-measured target in the unit time in the test power consumption segments through linear regression; and
determining the dynamic power consumption according to a fitting result.

17. The computer program product of claim 13, wherein the computer-executable instructions when executed by the processor of the apparatus further cause the apparatus to:
input the target signals to a plurality of counters; and
count statistical values of the target signals in the unit time using the counters.

18. The computer program product of claim 13, wherein the target signals reflect a toggling status of each circuit module of a plurality of circuit modules in the to-be-measured target.

* * * * *

UNITED STATES PATENT AND TRADEMARK OFFICE
CERTIFICATE OF CORRECTION

| | | |
|---|---|---|
| PATENT NO. | : 12,099,392 B2 | Page 1 of 1 |
| APPLICATION NO. | : 17/014371 | |
| DATED | : September 24, 2024 | |
| INVENTOR(S) | : Wei Wei, Zhou Zhou and Yuwei Pu | |

It is certified that error appears in the above-identified patent and that said Letters Patent is hereby corrected as shown below:

In the Claims

Claim 8, Column 12, Line 57: "cycles; and" should read "cycles;"

Signed and Sealed this
Twenty-second Day of October, 2024

Katherine Kelly Vidal
*Director of the United States Patent and Trademark Office*